Patented June 27, 1950

2,512,663

UNITED STATES PATENT OFFICE 2,512,663

CHOCOLATE ESSENCE OR EXTRACT

Benjamin I. Masurovsky, Bronx, N. Y., assignor to Choco-Essence Inc., New York, N. Y., a corporation of New York No Drawing. Application April 25, 1947, Serial No. 744,037

28 Claims. (Cl. 99—23)

1

This invention relates to chocolate essence or extract and has for its object certain improvements in the method of producing chocolate essence or extract.

In the manufacture of the leading types of prepared cocoa powder, it is customary to roast cocoa beans which have been removed from the mucilaginous matter surrounding them in their pods. The beans are then cooled and gently crushed in a "kibbling mill" to fracture their crisp shells and to break down their kernels into their natural angular fragments, usually referred to as cocoa nibs. The nibs and shells are separated by winnowing and sieving. The object of roasting the cocoa beans is to develop to the fullest extent their characteristic aroma and flavor. The roasted cocoa nibs are ground into a chocolate liquor by means of mill stones or steel rollers. If the chocolate liquor is to be converted into cocoa powder, the liquor is put into a hydraulic press and a percentage of cocoa butter is extracted therefrom. The residue, known as cake, is then pulverized to form cocoa powder. If the liquor is to be converted into what is commonly called chocolate, sugar and flavor are added.

To prepare the so-called essence or extract of chocolate, it is customary to grind the resulting cakes into a fine powder. This powder is then suitably treated with a solvent, such as alcohol or ether, to extract the desired flavor constituents. The solvent solution is then suitably separated from the cocoa residues. Chocolate essence or extract in this form has certain inherent disadvantages for certain uses because it contains cocoa butter necessarily extracted from the cocoa-bearing material by the action of the solvent. Such an essence or extract is not suitable, for example, as a flavoring material for milk, carbonated soft drinks, etc., unless it is first emulsified so as to be dispersible. A dispersing agent is sometimes added to the emulsified essence to insure dispersion of the cocoa butter globules throughout the milk, carbonated soft drinks or other liquid vehicle in which it is used.

As a result of my investigations, I have discovered an improved chocolate essence or extract which does not have the disadvantages of the customary essence or extract. The desired flavor or essense constituents of the chocolate may be obtained substantially free of cocoa butter and there is, therefore, no need to emulsify it or to add a dispersing agent, for use in milk, carbonated soft drinks or other liquid vehicles. The desired flavor constituents of the improved chocolate essence or extract are present in water solution and are, therefore readily miscible in milk, carbonated soft drinks, and other liquid mediums.

In accordance with the invention, roasted cocoa nibs in their normally acid state, and while still containing their original butter fat, are treated with a hot soluton of an edible compound that is adapted to aid in extracting the desired flavor or essence constituents from the cocoa-bearing material. The edible compound may be a salt, alkaline or acid; or it may be an acid, organic or inorganic. The compound is used preferably in amount insufficient greatly to alter the normal acidity of the nibs. The nibs are permitted to brew until they swell and the desired flavor and essence constituents are extracted therefrom, after which the resulting chocolate extract solution, substantially free of cocoa butter, is separated from the nibs.

Another important advantage of the invention is that the nibs treated in this manner may then be processed in any of the conventional ways to produce cocoa products of various kinds. In other words, although an essence or extract is obtained from the nibs, the nibs may thereafter be used precisely as they have been heretofore. For example, they may be "Dutched." To this end it is customary to treat ground nibs with a substantial amount of alkaline salt, often 2–3% by weight of the nibs. This causes the normally acid nibs to become alkaline and is intended to render the cocoa powder more readily soluble.

Cocoa beans are obtained from various parts of the world, being usually identified by the name of the section in which they are grown. Among the better known cocoa beans are the Accra, Bahia, Caracas, Lagos, Port Cabelo, Sanchez, Trinidad, etc. The beans are normally acid and the acidity carries over into the roasted nibs. As is to be expected, the amount of acidity tends to vary somewhat with the source of the beans and even as between batches of beans from the same source. In the practice of the invention, the chocolate essence or extract is obtained without destroying that acidity. To this end the alkaline salt is used in relatively small amounts. And the acid salt and the acid are also used in relatively small amounts so as not greatly to increase the acidity of the extract and the nibs. This leaves the extract for the most part slightly on the acid side, which is a preferred condition for the uses to which the extract is normally put.

In a presently preferred practice of the invention, the cocoa-bearing material is in the form of roasted unground cocoa nibs containing their original butter fat. The edible compound is dissolved in a suitable amount of water, depending upon the amount and character of cocoa nibs to be treated and the desired concentration of the extract. The resulting solution is heated to an elevated temperature, for example its boiling point. Further heating of the solution is then advantageously discontinued. The roasted cocoa nibs are introduced into the heated solution and are permitted to brew. The salt or acid in the solution appears to function at least in part as a wetting agent. The nibs tend promptly to begin swelling. The swelling stretches the fibrous, lattice-like structure of the nib and distends its pores. This permits the solution to enter into the internal structure of the nibs. The nibs have such an affinity for and imbibe the salt or acid solution to such an extent that, by what appears to be a process of osmosis, the flavor and essence constituents are extracted from the nibs and transferred to the solution.

The brew is permitted to cool as the extraction process continues. If the brew were heated, at least unduly, an objectionable amount of the more volatile flavor constituents would be lost. The extraction results in the removal of water-soluble constituents from the nibs. It is these water-soluble, and perhaps some colloidal, constituents, which have not been completely identified, which give the flavoring value to the extract. The resulting mixture is then passed through a fine mesh screen to separate the treated nibs from the water extract. The extract may be suitably sweetened, if desired. It is packaged in containers for subsequent use.

EDIBLE ALKALINE SALT

To illustrate the effect of the alkaline salt solution on the roasted nibs, the following tests were conducted:

Solutions

In order to obtain comparative results, four different solutions were prepared, one consisting solely of distilled water and the other three consisting of distilled water and varying amounts of di-sodium phosphate salt; and the pH of each was determined with a Beckman, Glass Electrode Model D, pH Meter.

|  | pH |
|---|---|
| #1 solution 500 cc. $H_2O$ (no salt) | 6.35 |
| #2 solution 500 cc. $H_2O$ + ½ gr. (.1%) salt | 8.00 |
| #3 solution 500 cc. $H_2O$ + ¾ gr. (.15%) salt | 8.13 |
| #4 solution 500 cc. $H_2O$ + 1 gr. (.2%) salt | 8.25 |

Mixtures

The four solutions were then heated to 100° C. and a 5 gr. batch of roasted cocoa nibs from Accra beans was placed in 95 cc. of each solution. The nibs were left immersed for two hours, as the temperature of the mixtures gradually fell, after which each batch of nibs was separated from its resulting extract. The nibs were put aside to dry.

Extracts

The extracts were checked to determine their pH values.

|  | pH |
|---|---|
| #1 extract from #1 solution+nibs | 5.5 |
| #2 extract from #2 solution+nibs | 6.4 |
| #3 extract from #3 solution+nibs | 6.7 |
| #4 extract from #4 solution+nibs | 6.92 |

On comparing the pH values of the "solutions" with the pH values of the "extracts," it will be seen that the latter are on the acid side, below pH 7, the neutral point.

Treated nibs

Each batch of treated nibs was immersed in 95 cc. of distilled water initially heated to 100° C. After soaking for two hours, as the temperature of the mixtures gradually dropped, the nibs were separated and the resulting filtrates were tested for their pH values.

|  | pH |
|---|---|
| #1 filtrate from #1 batch treated nibs | 6.25 |
| #2 filtrate from #2 batch treated nibs | 6.5 |
| #3 filtrate from #3 batch treated nibs | 6.45 |
| #4 filtrate from #4 batch treated nibs | 6.51 |

On checking the pH values of the filtrates, it will be seen that they are all on the acid side and that there is not a great deal of difference between them. These tests show that the acidity of the original nibs was not destroyed by the amount of alkaline salt employed. Furthermore, there is not a great deal of difference between the pH values of the "filtrates" and the "extracts."

EDIBLE ACID SALT

Similar tests were conducted to illustrate the effect of the acid salt solution on the roasted nibs. While such a salt would obviously not destroy the natural acidity of the nibs, the tests do indicate that an excellent extract may be obtained without altering to a great extent the normal acid value of the nibs.

Solutions

As before, four solutions were prepared, one solely distilled water and the other three distilled water to which were added varying amounts of edible acid salt in the form of ordinary cream of tartar (potassium hydrogen tartrate, $KHC_4H_4O_6$); and the pH of each was determined with the same Beckman meter.

|  | pH |
|---|---|
| #1 solution 500 cc. $H_2O$ (no salt) | 6.35 |
| #2 solution 500 cc. $H_2O$+½ gr. (.1%) salt | 4.0 |
| #3 solution 500 cc. $H_2O$+¾ gr. (.15%) salt | 3.85 |
| #4 solution 500 cc. $H_2O$+1 gr. (.2%) salt | 3.7 |

Mixtures

Proceeding as before, the four solutions were heated to 100° C. A 5 gr. batch of roasted cocoa nibs from Accra beans was placed in 95 cc. of each solution. The nibs were left to brew for two hours, as the temperature of the mixtures dropped, after which the resulting extracts were separated from the batches of nibs. The nibs were put aside to dry.

Extracts

The pH values of the extracts were then determined, with these results:

|  | pH |
|---|---|
| #1 extract from #1 solution+nibs | 5.4 |
| #2 extract from #2 solution+nibs | 4.52 |
| #3 extract from #3 solution+nibs | 4.23 |
| #4 extract from #4 solution+nibs | 4.1 |

A comparison of the pH values of the "solutions" with that of the "extracts" shows that the acidity of the latter increased progressively with the increase in the amount of acid salt in the solutions, as was to be expected. And as is also to be expected on comparing the pH values of the extracts obtained with the acid solutions with the pH values of the extracts obtained with the alkaline solutions, the former are more acid.

Treated nibs

The dried batches of treated nibs were each immersed in 95 cc. of distilled water heated to boiling (100° C.). After soaking for two hours, while the temperature of the mixtures gradually fell, the nibs were separated and the resulting filtrates tested for their pH values.

|  | pH |
|---|---|
| #1 filtrate from #1 batch treated nibs | 6.11 |
| #2 filtrate from #2 batch treated nibs | 5.9 |
| #3 filtrate from #3 batch treated nibs | 5.7 |
| #4 filtrate from #4 batch treated nibs | 5.59 |

The filtrates are, of course, all on the acid side. On comprising their pH values with those obtained for the filtrates in the alkaline salt tests, it will be noted that there is not a great deal of difference. In other words, in the amounts employed the acid salt did not greatly affect the normal acidity of the nibs. Also, on comparing the pH values of the "filtrates" and "extracts," it will be noted that they do not greatly differ from one another.

A number of highly useful edible salts are readily available for the extraction. They may be used alone or in combination. Among the alkaline salts are di-sodium phosphate, tri-sodium phosphate, sodium citrate, di-sodium citrate, sodium carbonate, sodium bicarbonate, sodium phosphate, etc. Among the acid salts are the acid potassium and sodium salt of tartaric acid (cream of tartar), acid potassium pyrophosphate, the citric acid salts of sodium and potassium, etc. It is of course economically preferred to employ a salt that is relatively inexpensive and that is not objectionable in taste in the amount employed to effect the extraction.

EDIBLE INORGANIC ACID

To illustrate the effect of an inorganic acid solution on the roasted nibs, the following tests were conducted:

Solutions

Four solutions were prepared, one of distilled water and three of distilled water plus varying amounts of 2% phosphoric acid (one of the more common edible acids, when used in small amounts).

|  | pH |
|---|---|
| #1 solution—distilled $H_2O$ (no acid) | 6.35 |
| #2 solution 475 cc. distilled $H_2O$ + 25 cc. (1.1%) acid | 2.5 |
| #3 solution 462½ cc. distilled $H_2O$ + 37½ cc. (.15%) acid | 2.15 |
| #4 solution 225 cc. distilled $H_2O$ + 25 cc. (.2%) acid | 2.15 |

Mixtures

The four solutions were heated to boiling. 5 gr. roasted Accra nibs were then added to 95 cc. of each solution and permitted to brew for two hours, as the temperature dropped. The extracts were separated and each batch of nibs put aside to dry.

Extracts

The following pH values were obtained:

|  | pH |
|---|---|
| #1 extract from #1 solution+nibs | 5.23 |
| #2 extract from #2 solution+nibs | 2.91 |
| #3 extract from #3 solution+nibs | 2.68 |
| #4 extract from #4 solution+nibs | 2.52 |

Treated nibs

Each batch of dried nibs was immersed in 95 cc. of the distilled water heated to boiling; allowed to soak for two hours, as the temperature dropped; the nibs were separated; and the pH values of the filtrates determined:

|  | pH |
|---|---|
| #1 filtrate from #1 batch treated nibs | 6.2 |
| #2 filtrate from #2 batch treated nibs | 4.62 |
| #3 filtrate from #3 batch treated nibs | 4.28 |
| #4 filtrate from #4 batch treated nibs | 4.08 |

EDIBLE ORGANIC ACID

(A) LACTIC ACID

The effects of edible organic acids were also observed:

Solutions

As before, four solutions were prepared—one with distilled water, and the other three with distilled water containing varying amounts of 2% lactic acid.

|  | pH |
|---|---|
| #1 solution—distilled $H_2O$ (no acid) | 6.35 |
| #2 solution 475 cc. distilled $H_2O$ + 25 cc. (.1%) acid | 3.0 |
| #3 solution 462½ cc. distilled $H_2O$ + 37½ cc. (.15%) acid | 2.79 |
| #4 solution 225 cc. distilled $H_2O$ + 25 cc. (.2%) acid | 2.72 |

Mixtures

After heating 95 cc. of each solution to its boiling point, 5 gr. roasted Accra nibs were placed in each. The nibs were permitted to brew for two hours as the temperature fell, after which they were separated from the extracts.

Extracts

The extracts tested as follows for pH values:

|  | pH |
|---|---|
| #1 extract from #1 solution+nibs | 5.2 |
| #2 extract from #2 solution+nibs | 4.1 |
| #3 extract from #3 solution+nibs | 3.69 |
| #4 extract from #4 solution+nibs | 3.56 |

Treated nibs

The dried treated nibs were immersed for two hours in 95 cc. of the distilled water initially heated to boiling, and permitted to soak as the temperature dropped. The nibs were separated and the filtrates tested:

|  | pH |
|---|---|
| #1 filtrate from #1 batch treated nibs | 6.13 |
| #2 filtrate from #2 batch treated nibs | 5.38 |
| #3 filtrate from #3 batch treated nibs | 5.18 |
| #4 filtrate from #4 batch treated nibs | 4.95 |

(B) CITRIC ACID

Similar tests were conducted with citric acid, the acid being used in the form of crystals.

Solutions

|  | pH |
|---|---|
| #1 solution—distilled $H_2O$ (no acid) | 6.35 |
| #2 solution 500 cc. distilled $H_2O$ + ½ gr. (.1%) acid | 2.88 |
| #3 solution 500 cc. distilled $H_2O$ + ¾ gr. (.15%) acid | 2.83 |
| #4 solution 500 cc. distilled $H_2O$ + 1 gr. (.2%) acid | 2.80 |

Mixtures 95 cc. of each solution were heated to boiling, after which 5 gr. roasted Accra nibs were brewed therein, as the temperature dropped. The nibs were separated and dried, and the extracts tested for pH.

*Extracts*

| | pH |
|---|---|
| #1 extract from #1 solution+nibs | 5.31 |
| #2 extract from #2 solution+nibs | 4.12 |
| #3 extract from #3 solution+nibs | 3.78 |
| #4 extract from #4 solution+nibs | 3.62 |

*Treated nibs*

Each batch of dried nibs was brewed in 95 cc. of the distilled water for two hours, the water being initially heated to boiling and then permitted to drop in temperature. The nibs were separated and the filtrates tested for pH.

| | pH |
|---|---|
| #1 filtrate from #1 batch treated nibs | 6.4 |
| #2 filtrate from #2 batch treated nibs | 5.2 |
| #3 filtrate from #3 batch treated nibs | 4.78 |
| #4 filtrate from #4 batch treated nibs | 4.69 |

A number of highly useful edible acids are available for the extraction. They may be used alone or in combination. Among the inorganic acids are phosphoric, hydrochloric, etc. Among the organic acids are lactic, citric, tartaric, malic, acetic, etc. As with the salts, it is economically advisable to employ an acid that is relatively inexpensive and that is not objectionable in taste in the amount employed to make the extraction.

In the data given above for the tests, the figures ".1%", ".15%" and ".2%" are intended to indicate the finished strengths of the solutions after the salts and acids were added thereto.

Since the cocoa-bearing material employed is itself acid, it is inadvisable to use more acid than necessary to obtain the desired extraction. This not only saves acid, but it also assures an extract that is not overly acid and leaves the treated nibs in a state of acidity closely approaching their normal acidity, which better adapts them for the conventional methods of producing cocoa products.

Various forms of cocoa-bearing material may be employed, such as the cocoa beans, crushed or uncrushed, with or without the shells, roasted or unroasted; cocoa nibs, roasted or unroasted, ground or unground, etc. The primary consideration is that the materials employed have sufficient cocoa to permit extraction of a suitable amount of chocolate essence of satisfactory quality.

The resulting chocolate essence or extract is a water solution, free or substantially free of cocoa butter. As such, it is readily miscible in liquid mediums, such as milk and carbonated soft drinks. It will be clear to those skilled in this art that the chocolate essence or extract of the invention is greatly superior to that heretofore produced.

I claim:

1. The method of producing chocolate extract which comprises extracting flavor and essence constituents of cocoa-bearing material while it is in its normal acid condition and while it still contains its original cocoa butter with a heated aqueous solution of a compound from the class consisting of edible acids and their edible acid and alkaline salts, the extracting solution containing said compound in amount insufficient to destroy the acidity of the cocoa-bearing material, and separating the chocolate extract solution substantially free of cocoa butter from the residue of acid cocoa-bearing material.

2. The method of producing chocolate extract as set forth in claim 1, in which the cocoa-bearing material is extracted with a heated aqueous solution of an edible acid.

3. The method of producing chocolate extract as set forth in claim 1, in which the cocoa-bearing material is extracted with a heated aqueous solution of an edible inorganic acid.

4. The method of producing chocolate extract as set forth in claim 1, in which the cocoa-bearing material is extracted with a heated aqueous solution of phosphoric acid.

5. The method of producing chocolate extract as set forth in claim 1, in which the cocoa-bearing material is extracted with a heated aqueous solution of an alkaline salt of an edible acid.

6. The method of producing chocolate extract as set forth in claim 1, in which the cocoa-bearing material is extracted with a heated aqueous solution of an alkaline salt of an edible inorganic acid.

7. The method of producing chocolate extract as set forth in claim 1, in which the cocoa-bearing material is extracted with a heated aqueous solution of an alkaline salt of phosphoric acid.

8. The method of producing chocolate extract as set forth in claim 1, in which the cocoa-bearing material is extracted with a heated aqueous solution of disodium phosphate.

9. The method of producing chocolate extract as set forth in claim 1, in which the cocoa-bearing material is extracted with a heated aqueous solution of sodium bicarbonate.

10. The method of producing chocolate extract which comprises treating roasted, un-Dutched, unground cocoa nibs in their normally acid condition and while they still contain their original cocoa butter with a heated aqueous solution of a compound from the class consisting of edible acids and their edible acid and alkaline salts, the solution containing said compound in amount insufficient to destroy the acidity of the nibs, permitting the nibs to brew in said solution until they swell and flavor and essence constituents are extracted therefrom, and separating the resulting chocolate extract solution substantially free from cocoa butter from the residue of acid nibs.

11. The method of producing chocolate extract as set forth in claim 10, in which the cocoa nibs are extracted with a heated aqueous solution of an edible acid.

12. The method of producing chocolate extract as set forth in claim 10, in which the cocoa nibs are extracted with a heated aqueous solution of an edible inorganic acid.

13. The method of producing chocolate extract as set forth in claim 10, in which the cocoa nibs are extracted with a heated aqueous solution of phosphoric acid.

14. The method of producing chocolate extract as set forth in claim 10, in which the cocoa nibs are extracted with a heated aqueous solution of an alkaline salt of an edible acid.

15. The method of producing chocolate extract as set forth in claim 10, in which the cocoa nibs are extracted with a heated aqueous solution of an alkaline salt of an edible inorganic acid.

16. The method of producing chocolate extract as set forth in claim 10, in which the cocoa nibs are extracted with a heated aqueous solution of an alkaline salt of phosphoric acid.

17. The method of producing chocolate extract as set forth in claim 10, in which the cocoa nibs are extracted with a heated aqueous solution of disodium phosphate.

18. The method of producing chocolate extract as set forth in claim 10, in which the cocoa nibs are extracted with a heated aqueous solution of sodium bicarbonate.

19. The method of producing chocolate extract as set forth in claim 1 in which the cocoa-bearing material is extracted with a heated aqueous solution of a compound from the class consisting of edible organic acids and their edible acid and alkaline salts.

20. The method of producing chocolate extract as set forth in claim 1 in which the cocoa-bearing material is extracted with a heated aqueous solution of an edible organic acid.

21. The method of producing chocolate extract as set forth in claim 1 in which the cocoa-bearing material is extracted with a heated aqueous solution of an edible organic acid from the group consisting of lactic acid, citric acid, tartaric acid, malic acid and acetic acid.

22. The method of producing chocolate extract as set forth in claim 1 in which the cocoa-bearing material is extracted with a heated aqueous solution of lactic acid.

23. The method of producing chocolate extract as set forth in claim 1 in which the cocoa-bearing material is extracted with a heated aqueous solution of a salt of an edible organic acid from the group consisting of potassium and sodium salts of tartaric and citric acids.

24. The method of producing chocolate extract as set forth in claim 10 in which the cocoa nibs are treated with a heated aqueous solution of a compound from the class consisting of edible organic acids and their edible acid and alkaline salts.

25. The method of producing chocolate extract as set forth in claim 10 in which the cocoa nibs are treated with a heated aqueous solution of an edible organic acid.

26. The method of producing chocolate extract as set forth in claim 10 in which the cocoa nibs are treated with a heated aqueous solution of an edible organic acid from the group consisting of lactic acid, citric acid, tartaric acid, malic acid and acetic acid.

27. The method of producing chocolate extract as set forth in claim 10 in which the cocoa nibs are treated with a heated aqueous solution of lactic acid.

28. The method of producing chocolate extract as set forth in claim 10 in which the cocoa nibs are treated with a heated aqueous solution of a salt of an edible organic acid from the group consisting of potassium and sodium salts of tartaric and citric acids.

BENJAMIN I. MASUROVSKY.

REFERENCES CITED

The following references are of record in the file of this patent:

UNITED STATES PATENTS

| Number | Name | Date |
| --- | --- | --- |
| 1,650,355 | Hocker | Nov. 22, 1927 |
| 2,014,342 | Gutekunst | Sept. 10, 1935 |
| 2,380,158 | Durrenmatt et al. | July 10, 1945 |
| 2,397,402 | Benedict | Mar. 26, 1946 |

OTHER REFERENCES

"Cocoa and Chocolate," by Whymper, 1912, p. 279.